United States Patent [19]

Scaramucci

[11] 4,431,021

[45] Feb. 14, 1984

[54] NEEDLE VALVE

[76] Inventor: John P. Scaramucci, 10724 Woodridden, Oklahoma City, Okla. 73170

[21] Appl. No.: 334,449

[22] Filed: Dec. 24, 1981

[51] Int. Cl.³ .............................................. B67C 3/16
[52] U.S. Cl. ................................... 137/205; 251/223; 251/361
[58] Field of Search ............... 251/223, 225, 360, 361, 251/DIG. 4; 137/375, 205

[56] References Cited

U.S. PATENT DOCUMENTS

| | | | |
|---|---|---|---|
| 3,240,230 | 3/1966 | Callahan, Jr. et al. | 251/223 |
| 3,761,052 | 9/1973 | Tobbe et al. | 251/361 X |
| 3,910,553 | 10/1975 | Boylan | 251/225 X |
| 3,916,950 | 11/1975 | Mongerson et al. | 251/361 X |

FOREIGN PATENT DOCUMENTS 1186762  9/1959  France .............................. 251/225

*Primary Examiner*—Martin P. Schwadron
*Assistant Examiner*—Sheri Novack
*Attorney, Agent, or Firm*—Dunlap & Codding

[57] ABSTRACT

A needle valve comprises a valve body including a conduit portion through which a flow passage is formed and a bonnet portion which screws into a cylindrical well formed in one side of the conduit portion to intersect the flow passage and form a valve chamber within the valve body. The bonnet portion is bored through to support a valve stem upon which is mounted a frusto-conical member, the valve stem and the bore through the bonnet portion being threaded for movement of the frusto-conical member transversly across the flow passage via turning the valve stem. A tubular liner, formed of a flexible material, extends around the periphery of the valve chamber and is split into two semi-cylindrical sections which receive the frusto-conical member and are spread thereby against portions of the valve chamber wall pierced by the flow passage as the frusto-conical member is seated in the liner. Tabs are formed on the bottoms of the liner to extend into a slot formed in the bottom of the valve chamber to prevent rotation of the liner without interfering with the spreading of the liner to seal the valve against flow through the flow passage.

5 Claims, 6 Drawing Figures

NEEDLE VALVE

BACKGROUND OF THE INVENTION

The present invention relates generally to improvements in needle valves, and more particularly, but not by way of limitation, to the construction of seals for valves of this type.

Needle valves generally comprise a class of valves in which a circular valve member, or needle, is mounted in a valve body for axial movement into an obstructing relation with a flow passage formed through the valve body. Usually, such movement is accomplished by forming threads on the valve member to mate with corresponding threads formed in a portion of the valve body so that the axial movement of the valve member can be effected by turning the valve member. In a particular type of needle valve, the valve member comprises a frusto-conical member, which alternatively obstructs the flow passage or is displaced therefrom to permit flow through the valve, and a threaded valve stem which extends axially from the larger end of the frusto-conical member. In this species of needle valve, the flow passage extends transversely to the axis of the frusto-conical member and it is known to include a liner, or seal, which receives the frusto-conical member and is mounted in a valve chamber formed within the valve body to intersect the flow passage.

Needle valves of the particularly described type have the potential for offering a variety of advantages in the control of fluid flow. In particular, because of the relative simplicity of construction of valves of this type, a potential exists for providing a valve capable of operation under a variety of conditions, including high pressure applications, with little or no maintenance and at a relatively low cost. However, prior to the present invention such potential has not been fully realized because of problems that exist with respect to the seals in prior art valves of this type. For the valve to operate, the seal must have apertures formed therethrough to align with openings of the flow passage into the valve chamber and the seal must be held in place within the valve chamber to maintain such alignment. In addition, the seal must also tightly engage portions of the valve chamber wall which are pierced by the flow passage openings and the frustoconical member, when the valve is closed, to prevent leakage through the valve. While it is possible to construct needle valves to meet these criteria, such construction has, in the past, generally been accompanied with increased machining costs, difficulty in assembly of the valve, or both. Alternatively, where cost and ease of assembly are important factors in the manufacture of a valve, compromises have been made in the sealing effectiveness of the valve or in the applications to which a valve might be put; for example, low cost might be achieved by limiting the valve to low pressure applications.

SUMMARY OF THE INVENTION

The present invention eliminates the need for compromises in the effectiveness or range of application of valves of the above described type, while retaining the low cost and ease of assembly characteristics potentially available in the manufacture of such valves, by a novel construction of the valve seal or liner which receives the frusto-conical portion of the valve member in conjunction with providing the valve chamber with particular geometrical characteristics. In particular, a slot is formed in portions of the valve body defining one end of the valve chamber, facing the small end of the frusto-conical portion of the valve member, and such slot is disposed to extend parallel with the flow passage through the valve body. Concurrently, the seal, or liner is formed in two semi-cylindrical parts, at least one of which includes a tab that extends into the slot to lock the liner in a position wherein apertures formed through the liner, one aperture being formed through each of the semi-cylindrical members, will be held in alignment with the openings of the flow passage into the valve chamber. The liner is constructed of a flexible material and is further constructed such that, when the two halves are placed together the nominal diameter of the liner will be slightly smaller than the nominal inside diameter of the valve chamber. Such construction of the liner permits the valve to be manufactured without requiring machining portions of the valve to close tolerances and further facilitates the assembly of the valve in that the halves of the liner are readily inserted into the valve chamber. Since the slot in the bottom of the valve chamber extends parallel to the axis of the flow passage, portions of the liner halves can separate despite the presence of the locking tab to tightly engage portions of the valve chamber wall pierced by the flow passage as the frusto-conical member enters the liner to provide effective sealing of the valve in applications including high pressure application. Thus, the present invention provides a needle valve which realizes the full potential of such valves with respect to cost, ease of assembly, relatively trouble free operation and wide range of applications to which such valves might be put.

An object of the present invention is to provide a needle valve which combines low cost of manufacture with effective sealing characteristics.

Another object of the invention is to provide an inexpensive needle valve capable of a wide range of applications.

Still a further object of the invention is to provide a needle valve which can be easily assembled with no loss of sealing capability.

Other objects, advantages and features of the present invention will become clear from the following detailed description of the preferred embodiment of the invention when read in conjunction with the drawings and appended claims.

DESCRIPTION OF THE PREFERRED EMBODIMENT

Figure 1:
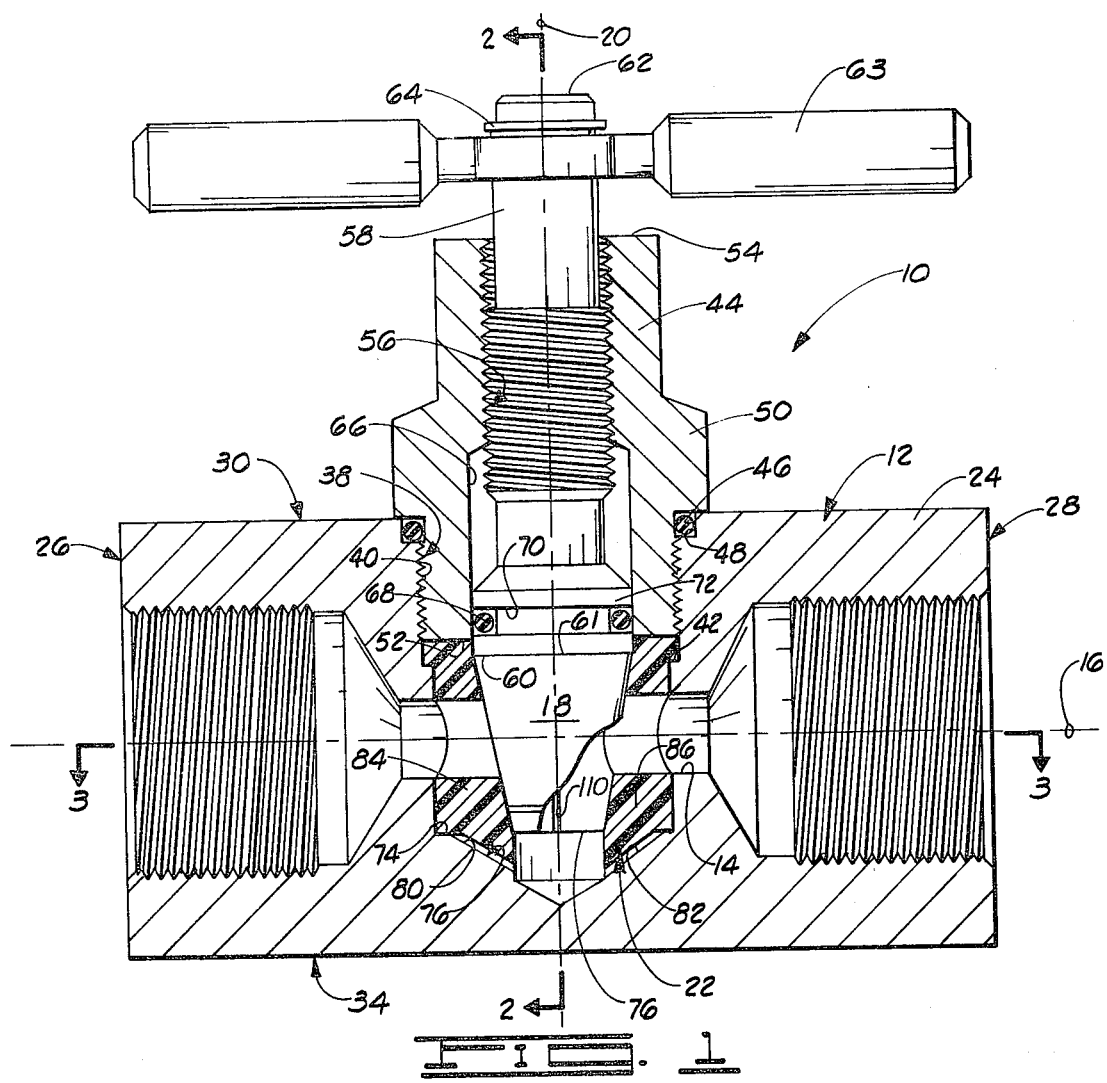
FIG. 1 is a side elevation in cross-section and partial cutaway of a needle valve constructed in accordance with the present invention.
Figure 2:
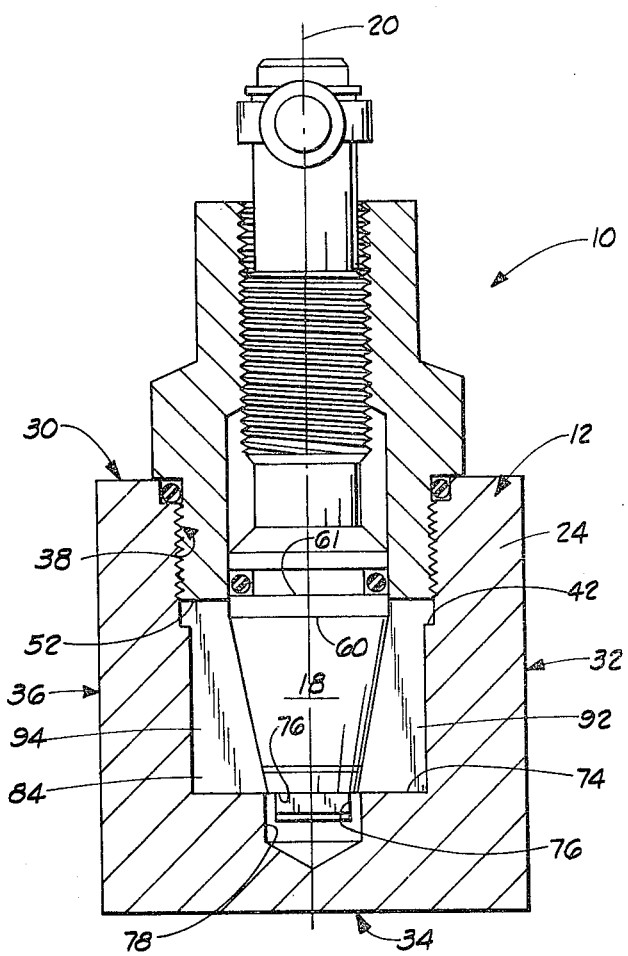
FIG. 2 is a cross-section in end elevation of the valve of FIG. 1 taken along line 2—2 of FIG. 1.
Figure 3:
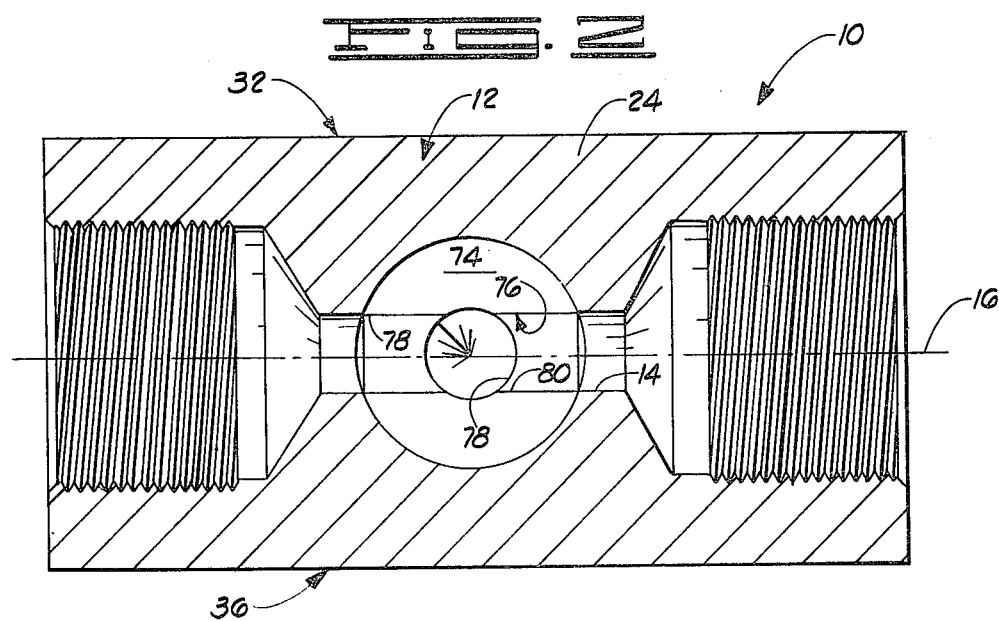
FIG. 3 is a cross-section of the valve of FIGS. 1 and 2 taken along line 3—3 of FIG. 1.

Referring now to the drawings in general, and to FIGS. 1 through 3 in particular, shown therein and designated by the general reference numeral 10 is a needle valve constructed in accordance with the present invention. The needle valve 10 generally comprises a valve body 12, through which a flow passage 14 is formed about a flow axis 16, and a frusto-conical member 18 which is mounted in the valve body 12 for movement along an axis 20, forming the axis of the frusto-conical member 18 and disposed to perpendicularly intersect the flow axis 16, to a position wherein the frusto-conical member 18 will obstruct the flow passage 14 so that the valve 10 can be opened and closed via the axial movement of the frusto-conical member 18 in the valve body 12. The position of the frusto-conical member 18 wherein the frusto-conical member 18 obstructs the flow passage 14 to close the valve 10 has been shown in FIGS. 1 and 2. In addition, the valve 10 comprises a generally tubular liner 22 mounted in the valve body 12 to receive the frusto-conical member 18 and form a seal between the frusto-conical member 18 and the valve body 12, at such times that the frusto-conical member 18 is moved into a position to obstruct the flow passage 14, to prevent leakage through the valve 10. The construction of the liner 22, a portion of which has been illustrated in FIGS. 4 through 6, will be described in detail below.

Referring first to the valve body 12, the valve body 12 comprises a conduit portion 24 which can preferably have the general exterior form of a rectangular parallelipiped as shown in FIGS. 1 through 3. Thus, the conduit portion 24 has a first end 26, an opposed second end 28, and four perpendicularly intersecting rectangular sides 30 through 36 (FIG. 2) which each perpendicularly intersect the ends 26 and 28 of the conduit portion 24 of the valve body 12. The flow passage 14 intersects the first end 26 of the conduit portion 24 and extends therefrom through central portions of the conduit portion 24 to intersect the second end 28 of the conduit portion 24. As shown in the drawings, portions of the flow passage 14 adjacent the ends 26 and 28 of the conduit portion 24 can be formed on an enlarged diameter and internally threaded to facilitate the mounting of the valve 10 in a conduit through which a fluid flow to be controlled by the valve 10 is to occur.

As is particularly shown in FIGS. 1 and 2, a cylindrical well 38 is formed in the side 30 of the conduit portion 24 about an axis selected to be the axis 20 of the frusto-conical member 18, the well 38 extending into the conduit portion 24 of the valve body 12 to intersect and extend across the flow passage 14. In the preferred embodiment of the valve 10, portions 40 of the well 38 adjacent the side 30 of the conduit portion 24 are formed on an enlarged diameter so that an internal shoulder 42 is formed in the periphery of the well 38 for a purpose to be discussed below.

The valve body 12 further comprises a bonnet portion 44 which is mounted on the conduit portion 24 to close the opening into the conduit portion 24 formed by the well 38 and to support the frusto-conical member 18 for movement in the valve body 12 as will be discussed below. In particular, the enlarged portion 40 of the well 38 is partially threaded, near the side 30 of the conduit portion 24, and one end of the bonnet portion 42 is externally threaded to screw into the well 38. The valve body 12 can conveniently be sealed at the side 30 of the conduit portion 24 via an O-ring 46 disposed in a groove 48 that intersects the side 30 of the conduit portion 24 and extends circumferentially about the well 38, the bonnet portion 44 being provided with a flange 50 extending about medial portions thereof to engage the side 30 of the conduit portion 24 and overlay the groove 48 when the valve 10 is assembled. The flange 50 fixes the depth to which the bonnet portion 44 extends into the well 38 and, in the preferred embodiment, such depth is selected such that the bonnet portion 44 terminates within the conduit portion 24 in an interior end 52 formed perpendicularly to the axis of the well 38; that is, the axis 20, and displaced a selected distance toward the side 30 of the conduit portion 24 from the shoulder 42.

The bonnet portion 44 extends outwardly of the side 30 of the conduit portion 24 to terminate in an exterior end 54 which is generally parallel to the interior end 52 and a bonnet portion bore 56 is formed through the bonnet portion 44 to intersect the ends 52 and 54 thereof. The bore 56 is formed concentrically with the threads near the interior end 52 of the bonnet portion 44, so that the bonnet portion bore 56 will be centered on the axis 20, and provides a means for supporting the frusto-conical member 18 for movement along the axis 20. In particular, portions of the bore 56 adjacent the exterior end 54 of the bonnet portion 44 are threaded and a valve stem 58, having threads formed on a medial portion thereof to mate with the threads in the bonnet portion bore 56, is screwed into the bore 56 and carries the frusto-conical member 18 on an interior end 60 of the valve stem 58 disposed within the valve body 12. Preferably, the valve stem 58 and the frusto-conical member 18 are formed in one piece to comprise the valve member of the valve 10, the large end 61 of the frusto-conical member 18 coinciding with the interior end 60 of the valve stem 58. Exteriorly of the bonnet portion 44, the valve stem 58 terminates in an exterior end 62 which carries a handle 63 secured to the valve stem via a clip 64.

Portions of the bore 56 of the bonnet portion 44 adjacent the interior end 52 of the bonnet portion 44 are formed on an enlarged diameter to provide a smooth peripheral surface 66 of such portions of the bore 56 for sealing the bore 56 via an O-ring 68 mounted in a groove 70 formed in an enlarged diameter portion 72 of the valve stem 58 adjacent the interior end 60 thereof. The smooth portion of the bore 56 extends a distance into the bonnet portion 44 of the valve body 12 to permit the major portion of the frusto-conical member 18 to be drawn into the bonnet portion 18 for opening the valve 10.

As will be clear from the above description of the valve body 12, the conduit portion 24 and bonnet portion 44 thereof coact to form a valve chamber defined generally by the interior end 52 of the bonnet portion 44, the bottom 74 of the well 38, and portions of the periphery of the well 38 between such interior end 52 and well bottom 74. One aspect of the present invention is the shaping of the well bottom 74; that is, of the end of the valve chamber facing the small end 76 of the frusto-conical member 18. In particular, and as best shown in FIGS. 2 and 3, the well bottom 74 is generally flat and parallel to the interior end 52 of the bonnet portion 44 and has a slot 76 formed therein parallel to the flow axis 16, the slot 76 extending nearly the diameter of the valve chamber. (A pilot hole 78, formed in the conduit portion 24 for boring the well 38 can conveniently extend to a depth greater than the well bottom 74 to facilitate the cutting of the slot 76 in the well bottom 74.) The slot 76 has first and second end portions 80, 82 which preferably extend on a slant from the pilot hole 78 to intersect the well bottom 74 below the openings of the flow passage 14 into the well 38 as is best shown in FIG. 1.

The liner 22 is constructed of a flexible material such as polytetrafluoroethylene and is disposed within the valve chamber to extend about the frusto-conical member 18 to seal the valve 10 against fluid flow at such times that the frusto-conical member 18 is extended into the valve chamber to close the valve 10. In the practice of the present invention, the liner 22 is comprised of two semi-cylindrical members 84, 86, which are preferably identical, and FIGS. 4 through 6 have been provided to illustrate the form of the semi-cylindrical member 84.

Figures 4, 5, 6:
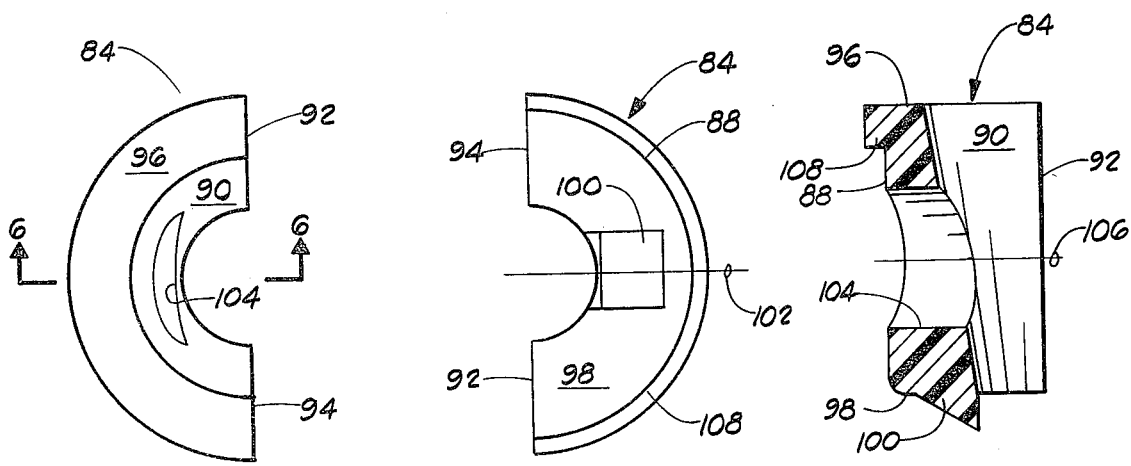
FIG. 4 is a plan view of one of the semi-cylindrical members of the liner of the valve shown in FIG. 1.
FIG. 5 is a bottom view of the semi-cylindrical member shown in FIG. 4.
FIG. 6 is a cross-section in side elevation of the semi-cylindrical member taken along line 6—6 of FIG. 4.

As shown in these Figures, the semi-cylindrical member 84 has a semi-circular outer periphery 88 and an inner periphery 90 which is shaped to conform to half a frusto-conical surface substantially identical to the longitudinally extending peripheral surface of the frusto-conical member 18. Coplanar faces 92, 94 (see, in particular, FIG. 2) intersect the surfaces 88 and 90 along a plane including the axis about which the surfaces 88 and 90 extend to provide the member 84 with a semi-cylindrical form. The member 84 has a planar upper end 96 which is perpendicular to the axis about which the surfaces 88 and 92 are formed, the upper end 92 intersecting the large end of the surface 90. Similarly, the member 84 has a planar lower end 98 which is parallel to the upper end 96 and is intersected by the smaller end of the surface 90. As best shown in FIGS. 5 and 6, a triangular tab 100 is formed on the lower end 98 of the semi-cylindrical 84 about an axis 102 which is perpendicular to the planar faces 92 and 94 of the member 84. In the preferred embodiment of the present invention, a semi-circular flange 108 is formed about the upper end 96 of the member 84. The semi-cylindrical member 86 is preferably identical to the semi-cylindrical member 84 but can differ therefrom in the omission of the tab 100 from the member 86.

As will be clear from the above description of the semi-cylindrical member 84, the liner 22, when assembled by abutting the planar faces 92, 94 of the member 84 with such faces of the member 86, will have a generally tubular form including a frusto-conical bore substantially mating with the longitudinal periphery of the frusto-conical member 18 and a cylindrical outer periphery formed coaxially with such bore. In the practice of the present invention, the outer periphery of the liner 22 is forced on a slightly smaller nominal diameter than the valve chamber formed by the well 38 and bonnet portion 44 of the valve body 12 so that the liner will loosely fit within the valve chamber. Thus, for example, where the nominal diameter of the valve chamber is 0.500 inch, the nominal diameter of the liner 22 can suitably be less than such diameter of the valve chamber by the amount of approximately 0.005 inch.

Ease of assembly of the valve 10 and low manufacturing costs are important considerations in the construction of the valve 10 so that it will be useful to consider the assembly of the valve 10 to relate the features of components thereof to these considerations. The assembly of the valve 10 takes place in two stages, the first stage consisting of the assembly of the bonnet portion 44 of the valve body 12, the valve stem 58, the frusto-conical portion 18, and the operating handle 63 into a single unit. Such stage is carried out by inserting the valve stem 58 into the botton portion bore 56, from the interior end 52 of the bonnet portion 44, and turning the valve stem 58 to screw the valve stem 58 into the bonnet portion 56 a distance sufficient to position substantially all of the enlarged portion 72 of the valve stem 58 within the enlarged portion of the bonnet portion bore 56 adjacent the interior end 52 of the bonnet portion 44. The operating handle 63 is then placed over the exterior end 62 of the valve stem 58 and the operating handle 63 is secured to the valve stem 58 via the clip 64.

The second stage of the assembly of the valve 10 is particularly facilitated by the above-described characteristics of the semi-cylindrical members 84 and 86 of the liner 22. Thus, the construction of the liner 22 to have a slightly smaller diameter than the valve chamber; that is, than portions of the well 38 near the bottom 74 thereof, permits the semi-cylindrical members 84, 86 to be easily inserted into the well 38 and turned therein so that the tab 100 of the semi-cyindrical member 84 (and the corresponding tab of the semi-cylindrical member 86 where such member is provided with a tab) will enter the slot 76. Such entry of the tab 100 into the slot 76 will position the semi-cylindrical members 84, 86 to either side of a plane bisecting the valve chamber perpendicularly to the flow axis 16 so that the apertures 104 of the semi-cylindrical members 84, 86 will align with the openings of the flow passage 14 into the valve chamber. The bonnet portion 44, with the valve stem 58, the frusto-conical member 18, and the operating handle 63 mounted thereon, can then be screwed into the well 38 to complete the assembly of the valve 10.

As noted above, in the preferred embodiment of the valve 10, the shoulder 42 is formed in the well 38 and the semi-cylindrical members 84 and 86 are provided with flanges 108. The flanges 108 and shoulder 42 particularly suit the valve 10 for use in high pressure applications by providing a positive lock against dislodgement of the semi-cylindrical members 84 and 86 from the above recited positions thereof in the valve body 12 as the frusto-conical member 18 is withdrawn from the liner bore formed by the frusto-conical surfaces 90 of the semi-cylindrical members 84 and 86. For this purpose, it will suffice for the flange 108 to have a thickness of substantially the separation between the shoulder 42 and the interior end 52 of the bonnet portion 44 of the valve body 12 so that the liner 22 will be loosely mounted in the valve body 12 but will be securely locked into postion by the coaction of the tab 100 and the slot 76, the coaction of the faces 92, 94 of the two semi-cylindrical members 84, 86, and the coaction of the flanges 108 with the shoulder 42 and interior end 52 of the bonnet portion 44 of the valve body 12.

OPERATION OF THE PREFERRED EMBODIMENT

The valve 10 is opened and closed in the usual manner of needle valves; that is, by turning the operating handle to move the frusto-conical member 18 into and out of the bore 56 formed through the bonnet portion 44 of the valve body 12 so that the frusto-conical member 18 can be selectively positioned in a non-obstructing or an obstructing relation with the flow passage 14. An important aspect of the present invention is the coaction of the frusto-conical member 18 with the semi-cylindrical members 84 and 86 as the valve 10 is closed. Because of the loose mounting of the members 84, 86 in the valve chamber and, in addition, the alignment of the slot 76 in parallel relation with the flow axis 16, the liner 22 can expand by movement of the semi-cylindrical members 84, 86 along a line parallel to the axis 16 so that the semi-cylindrical members 84, 86 will separate during closure of the valve 10 as has been indicated by the gap 110 between the members 84, 86 in FIG. 1. (The gap 110 has been exaggerated for purposes of illustration.) The separation of the semi-cylindrical members 84, 86 by the insertion of the frusto-conical member 18 into the bore of the liner 22 formed by the surfaces 90 of the semi-cylindrical members 84, 86 results in the exterior peripheral surfaces 88 of the members 84, 86 coming into tight engagement with portions of the valve body 12 about the openings of the flow passage 14 into the valve chamber to provide the valve 10 with excellent sealing characteristics against leakage therethrough.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. In a valve of the type having a valve body and a frusto-conical member axially moveable in the valve body to obstruct a flow passage formed through the valve body transversely to the direction of movement of the frusto-conical member, wherein a cylindrical valve chamber intersecting the flow passage is formed in the valve body coaxially with said frusto-conical member and wherein the valve further comprises a flexible, tubular liner disposed within the valve chamber and having a frusto-conical bore to receive said frusto-conical member, said liner having apertures formed through portions thereof aligned with said flow passage, the improvement:

wherein a slot is formed in portions of the valve body forming one end of the valve chamber facing the small end of the frusto-conical member, said slot extending parallel to said flow passage;

wherein said liner is characterised as having a cylindrical outer surface formed on a diameter sightly smaller than the diameter of the valve chamber;

wherein said liner is split into two semi-cylindrical members positioned to either side of a plane bisecting the valve chamber perpendicularly to the flow passage; and wherein at least one of said semi-cylindrical members of the liner has a tab formed on one end thereof to extend into the slot at said one end of the valve chamber, thereby fixing the orientation of the liner about said frusto-conical member while enabling expansion of the liner.

2. The valve body of claim 1, wherein the valve body comprises:

a conduit portion through which the flow passage is formed, wherein the conduit portion has a cylindrical well formed in one side thereof and extending across the flow passage; and a bonnet portion mounted on the conduit portion to close said well to said one side of the conduit portion such that portions of said well constitute said valve chamber, wherein a bore is formed through the bonnet portion coaxially with the valve chamber; and wherein the valve further comprises:

a valve stem mounted within the bonnet portion bore for axial movement therein, wherein the valve stem has an interior end disposed within the valve body and an exterior end disposed externally of the valve body and wherein said frusto-conical member is mounted on the interior end of the valve stem.

3. The valve of claim 2 wherein portions of said well adjacent one side of the conduit portion of the valve body are formed an enlarged diameter so as to form an internal shoulder within said well;

wherein the semi-cylindrical members comprising said liner are further characterized as having flanges formed at one end thereof, said flanges engaging said shoulder and the liner extending therefrom into the smaller diameter portion of said well; and wherein portions of the bonnet portion extend into the enlarged diameter portion of the well such that said flanges are locked between the bonnet portion of the valve body and the shoulder formed in the well.

4. The valve of claim 3 wherein the portion of the well formed on an enlarged diameter and the portions of the bonnet portion extending thereinto are provided with mating threads whereby the bonnet portion screws into the conduit portion of the valve body.

5. The valve of claim 2, 3 or 4 wherein the bonnet portion bore and the valve stem are provided with mating threads whereby the frusto-conical member can be axially moved within the valve body by turning the valve stem within the bonnet member bore.

* * * * *